April 12, 1938.   W. H. MONTGOMERY ET AL   2,113,707
FISHING ROD TIP
Filed Jan. 26, 1937

Inventors
William H. Montgomery
Edward E. Montgomery
By Charles L. Reynolds
Attorney Patented Apr. 12, 1938

2,113,707

UNITED STATES PATENT OFFICE 2,113,707

FISHING ROD TIP

William H. Montgomery and Edward E. Montgomery, Bremerton, Wash.

Application January 26, 1937, Serial No. 122,380

10 Claims. (Cl. 43—24)

Our invention relates to an attachment for fishing rod tips, being a line guide incorporating a pulley over which the fishing line passes as it leaves the rod.

Fishing rod tips heretofore have usually been equipped with a rigid loop secured to the tip through which the fishing line passed as it left the rod. Sometimes damages loops, especially those of agate, have had sharp edges tending to fray the fishing line as its passed therethrough, and always were made of material of small diameter so that a line passing therethrough has been bent sharply, which tends to submit the material of the line to unduly severe and deteriorating strains. Moreover, the contact of the fishing line with such a loop has created sufficient friction that the line, upon occasion, does not move freely and smoothly in and out, at the will of the fisherman.

Under light line load especially, reduction of line friction to a minimum is often very necessary, as in fly casting, for example. Under heavy load, free movement and the absence of a sharp deflection in the line at the pole tip is desirable, both for the purpose of reducing the strain on the line and on the pole tip, and further to afford easier reeling in of the line by the fisherman. By decreasing the friction on the line the sensitivity of line feel is also increased, while the wear is decreased.

It is therefore our object to provide mechanism for decreasing the friction of a fishing line as it leaves the rod, and to increase the radius of the line's deflection arc at the rod's tip. The mechanism which we employ for this purpose incorporates a guide pulley supported from the fishing rod tip, about which the line passes and in which it is guided.

Another object of our invention is to provide such a line guiding attachment in which the guide pulley is supported for free swinging bodily about the rod as an axis as well as for rotation on its spindle, and which device preferably incorporates suitable mechanism to assist swinging of the guide pulley as the fishing line is deflected, thereby to maintain the fishing line at all times guided by the pulley.

A further object of our invention is to provide in addition to the pulley special line guide and pulley mounting means of such a character that the line can not readily jump the pulley, or if it does, will be automatically guided back upon the pulley, and the line will not be fouled either upon the pulley, the guide, or the support for the pulley and guide, but will at all times be free for immediate movement.

Still another object of our invention is to provide a device of this general character which will be of simple and compact construction, and especially an attachment which is of light weight, so that the load on the pole tip will not be appreciably increased.

Other objects, and more particularly those which are attributable to the particular novel features of construction of our device, will appear in the following description.

Our invention resides in the novel combination of parts constituting our device, as well as in the formation of the several parts and the manner in which they are combined as shown in the drawing and hereinafter described, the novel characteristics of which are particularly defined in the claims appended to this specification.

While various alterations may be made in the details of our device without departing from the spirit of our invention, we have illustrated in the drawing one form of our attachment which has been found to be suitable for our purpose.

Fishing rod tips incorporating swiveled line guide pulleys have not proven satisfactory heretofore. One principal reason for this is that if the swivel mechanism did not work perfectly, such as where its friction was slightly increased by an accumulation of corrosion, which is inclined to be prevalent in such mechanism, or by accumulation of foreign material, the fishing line was apt to be thrown off the pulley. As a result, instead of assisting guidance and movement of the line, the swiveled pulley ceased to be an aid, and such tip was then less effective than the usual tip employing a plain loop.

In our attachment this difficulty has been solved by providing a construction whereby it is virtually impossible for the fishing line to be thrown out of contact with the pulley. This result is effected by providing mechanism whereby deflection of the line from the plane of the pulley will produce a large purchase upon the pulley, tending to rotate its mounting, so that the plane of the pulley will again be aligned with the fishing line in its deflected position even though the pulley swivel mechanism may have developed considerable friction.

Our device has been shown as an attachment which may be fitted upon old rods, or which may be incorporated into new fishing rods. For this purpose a ferrule 1 may be slipped over the tip of a rod R and glued thereon or otherwise secured in any suitable manner. A sleeve 2, which caps the rod tip, is placed telescopically over the ferrule 1 to extend well downward thereover. This sleeve is of slight thickness or, if thicker, at its telescoped end it should be feathered down, and the sleeve should fit closely over the ferrule so that no appreciable break or projection occurs between the exposed surface of the ferrule and the end of the sleeve 2 which covers the ferrule.

Preferably the line guide mechanism is all supported from the sleeve 2, and this sleeve is mounted for free swiveling movement with respect to the ferrule 1; that is, the sleeve and ferrule are capable of relative rotation through a complete revolution about the axis of the rod. As a convenient mounting mechanism for the sleeve 2 to accomplish this action we have shown a disk 10 which makes a snug or driven fit in the sleeve 2. This disk, which will rotate in conjunction with the sleeve 2, may be interconnected with the ferrule 1 by a pivot pin 11 projecting through registering apertures in the disk 10 and in the closed end of the ferrule. This pin may fit loosely in both apertures, but we prefer that it be provided with a head disposed within the ferrule 1, and that it be riveted solidly or otherwise secured to the disk 10 to form an integral part thereof. Relative movement during operation of our device will then occur only between the pivot pin 11 and the ferrule 1.

Figure 1:
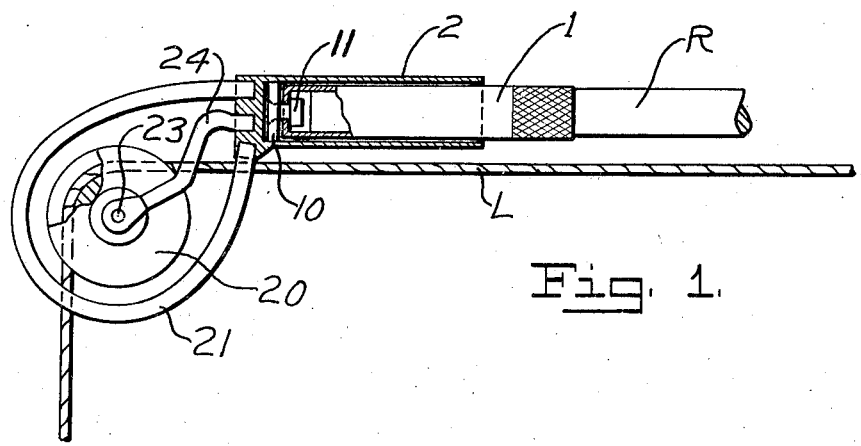
Figure 1 is a side elevation view of our fishing rod attachment, showing parts in section, taken along the line 1—1 of Figure 2.
Figure 2:
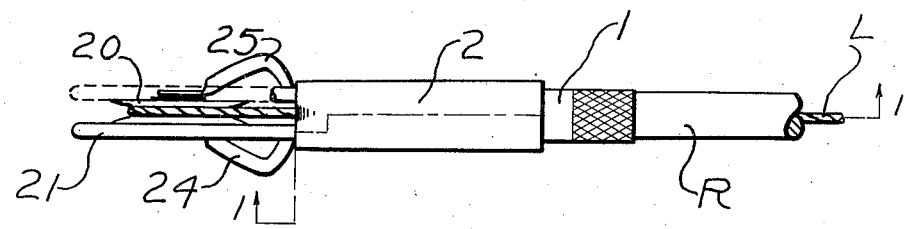
Figure 2 is a plan view of the attachment showing parts broken away.
Figure 3:
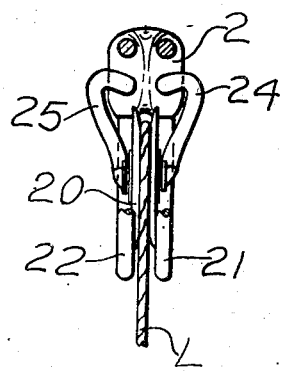
Figure 3 is an end elevation view in which certain parts have been broken away.

The pulley 20 and line guiding mechanism for the fishing line L are supported from the rotative sleeve 2. The pulley 20, of course, must be supported in a plane disposed radially of the fishing rod. Although the pulley may be disposed in a position substantially axially of the rod, we prefer that it be supported in a position eccentric of the tip thereof, as shown in Figure 1, for example. This location of the pulley will enable the line L passing beneath the rod to engage the side of the pulley toward the rod substantially tangentially. Thence the line will pass over the pulley and be deflected through an angle of the order of 90° in the ordinary attitude of use.

In order to insure that the fishing line is maintained in guiding contact with the pulley 20, we provide guides which extend or are disposed in a position well outward from the periphery of the pulley in a radial direction. For the sake of simplicity, lightness, and effectiveness we found that these guides may advantageously be formed as a pair of wire loops 21 and 22, which lie in registry in parallel planes. Each loop encircles and overlies in a substantially coplanar relation one flange of the pulley 20. Moreover, for greater line guiding effectiveness these wire loops, as shown best in Figure 1, are spaced radially outward from the pulley flanges, to extend well therebeyond.

Since the pulley 20, encircled by the loops 21 and 22, is disposed eccentrically of the fishing rod tip, and since it is preferable that the guide mechanism associated with the pulley be of such a nature that the fishing line will not readily be fouled thereby, we have found it desirable to secure the ends of the loops 21 and 22 in the swivel sleeve 2, so that one end of each loop is disposed substantially in prolongation of the sleeve 2, while the other end curves smoothly back to the sleeve from the other side of the pulley. In the construction illustrated, the ends of the loops in prolongation of the sleeve are received in the closed end of the sleeve 2, whereas the other ends of the loops are inserted into the side of this sleeve, so that the complete loops are deflected through an angle of approximately 270°. The loop ends may be welded, soldered or otherwise suitably anchored in or secured to the sleeve 2. Although we have described and shown these guide loops 21 and 22 as being secured in the sleeve 2, they might be supported from the sleeve through the intermediary of the pulley supporting means, although we do not now prefer such a construction.

The pulley 20, journaled on a pin 23, is preferably supported from the sleeve 2 independently of the guides 21 and 22 by means such as the bowed wire arms 24 and 25. The free ends of these wires support and are interconnected by the pulley pivot pin 23, while the other ends of these wires may be anchored in or secured to the sleeve 2 in the same manner as the ends of the loops 21 and 22 are secured, such as by welding or soldering. Between their ends the wires 24 and 25 are preferably bent outward beyond the plane of the guide loops 21 and 22, so that the line L will have free play except as it is guided by the loops, and will not become entangled by or even contact the wires 24 and 25. While the preferred supporting means for the pivot pin 23 of the pulley are wires such as 24 and 25, these might be replaced by plates or other equivalent mechanism. Moreover, while, as stated, we prefer that the pulley and the guide loops be supported independently from the sleeve 2, the pin 23 might be supported from chordal straps, secured one across each guide loop or a guide loop and a pulley supporting wire, such as the loop 21 and the wire 24, might be replaced by a single plate in which one end of the pin 23 is journaled. We prefer, however, that the construction illustrated be employed because of its characteristics of simplicity and lightness, although it is rugged, as well as because of its ease and economy of fabrication.

In the use of our attachment, thus described, it will be seen that the fishing line L extends beneath the rod to the end of its tip, and thence between loops 21 and 22, and between the pulley supporting wires 24 and 25 onto the pulley 20. In passing over the pulley it will be seen that the line, in deflecting through an angle of approximately 90°, is not subjected to a sharp strain, but curves about the arc of the pulley, which is of comparatively large radius. The part of the line which extends outward from the pulley is not unguided, but passes again between the guiding loops 21 and 22 which fairly closely embrace the line. The provision of these loops, both in front and in back of the pulley, prevent the line from being deflected from the plane of the pulley sufficiently for the line to be thrown from the pulley.

A very important function of the guide loops embracing the line on the side of the pulley away from the rod is to act as a means for swinging the pulley into alignment with the free end of the line when the latter is deflected. If, for example, a fish should jerk the line sidewise it would not tend to slide across the face of the pulley appreciably, but instead would engage and press against one or the other of the guide loops 21 and 22. Pressure on this loop exerted by the line is transmitted through the loop to rotate the sleeve 2. Since the sleeve also carries the pulley 20, it likewise will be rotated with the sleeve and guide loops, to a position wherein its plane will again lie in substantial alignment with the fishing line. It will be seen that engagement of the line with either loop occurs at a point considerably beyond the point of departure of the line from the pulley. The line pressure on the loop therefore has a large purchase tending to swing the sleeve 2 and the pulley supported therefrom.

Our device, therefore, forms a very effective line guide, since the portions thereof adjacent to the pulley are maintained at all times substantially in the plane of the pulley to keep the line running thereon, and means are provided to assist swinging of the pulley into alignment with the free end of the line when it is deflected, yet the line cannot be easily snarled by or upon the device.

What we claim as our invention is:

1. An attachment for fishing rod tips, comprising a grooved line guiding pulley, means supporting said pulley from the rod tip in a position eccentric of the rod tip and guiding it for swiveling about an axis paralleling the rod tip, and two spaced wires swiveling with the pulley, each wire overlying and generally conforming to the arc of its corresponding pulley flange on that portion of the periphery remote from the rod tip, and adapted to receive the fishing line therebetween to maintain the guide-engaged portion of the line generally in the plane of the pulley.

2. An attachment for fishing rod tips, comprising a grooved line guiding pulley, means supporting said pulley from the rod tip in position eccentric of the rod tip and guiding it for swiveling about an axis coinciding with the rod tip, guide means supported from the rod tip and extending in a direction away from such tip well beyond the pulley, said guide means being engageable by the fishing line extending from the periphery of the pulley remote from the rod tip as it tends to be deflected from the plane of the pulley, and means interengaged between said guide means and said pulley supporting means to effect swiveling of said pulley by the force applied to said guide means by pressure of the line thereagainst.

3. An attachment for fishing rod tips, comprising a grooved line guiding pulley, means supporting said pulley from the rod tip, two parallel line guiding loops devoid of connections between them, and encircling said pulley throughout substantially the entire periphery of the latter, and means supporting said loops from the rod tip, one loop being on one side and the other loop being on the other side of the fishing line, and each loop overlying and being spaced radially from its corresponding pulley flange.

4. An attachment for fishing rod tips, comprising a sleeve to cap the rod tip, a grooved line guiding pulley, means supporting said pulley in a position eccentric of the rod tip, and two parallel line guiding loops to lie in registry one on each side of the fishing line, each loop being bent through an angle of approximately 270 degrees extending outward from the end of said sleeve, encircling said pulley, and thence extending inward to the side of said sleeve.

5. The combination of claim 4, and means supporting said pulley directly from said sleeve independently of said loop.

6. The combination of claim 4, and means supporting the sleeve from the rod tip for rotation with respect thereto.

7. A line guide for fishing rod tips comprising an exteriorly smooth sleeve extending rearwardly over the pole tip, means within said sleeve supporting the same from the tip for full swiveling movement about the axis of the tip, a grooved pulley, arms extending forwardly and radially from the sleeve at opposite sides of the pulley, to form a rotative support for the latter, the weight of the pulley and arms tending to maintain the pulley depending vertically below the axis of the tip, and spaced bars disposed at opposite sides of the pulley and generally in the planes of its two flanges but spaced radially outward therefrom in front of and behind the pulley, to guide the line on and off the pulley.

8. A line guide for fishing rod tips comprising an exteriorly smooth sleeve extending rearwardly over the pole tip, means within said sleeve supporting the same from the tip for full swiveling movement about the axis of the tip, a grooved pulley, arms extending forwardly and radially from the sleeve at opposite sides of the pulley, to form a rotative support for the latter, the weight of the pulley and arms tending to maintain the pulley depending vertically below the axis of the tip, and two wire loops supported from the sleeve and disposed substantially coplanar with the pulley flanges, but spaced radially outward therefrom, cooperating to guide the line on and off the pulley.

9. A line guide for fishing rod tips comprising an exteriorly smooth sleeve extending rearwardly over the pole tip, means within said sleeve supporting the same from the tip for full swiveling movement about the axis of the tip, a grooved pulley, arms extending forwardly and radially from the sleeve at opposite sides of the pulley, to form a rotative support for the latter, the weight of the pulley and arms tending to maintain the pulley depending vertically below the axis of the tip, and two wire loops supported from the sleeve and disposed substantially coplanar with the pulley flanges, but spaced radially outward therefrom, cooperating to guide the line on and off the pulley, the upper edges of said loops being disposed substantially in prolongation of the sleeve end, and the lower edges of said loops curving smoothly back to the sleeve, whereby likelihood of the line looping thereabout is lessened.

10. A line guide for a fishing rod tip comprising a ferrule adapted for securement upon the tip, a disc freely swiveled on the end of the ferrule, for rotation about an axis coinciding with the axis of the tip, an exteriorly smooth sleeve secured on said disc and extending rearwardly over and lying close to the ferrule, a grooved pulley, members extending forwardly and radially from the end of the sleeve to support the pulley in a plane including the swivel axis, for rotation about an axis transverse to and below such swivel axis, and spaced line guiding members spaced radially outward from the pulley in front of and behind the latter, and disposed substantially in the plane of the pulley's flanges, said members being of smooth exterior contour, and smoothly joined to the sleeve, to minimize the likelihood of snarling the line.

WILLIAM H. MONTGOMERY.
EDWARD E. MONTGOMERY.